(12) United States Patent
Kim et al.

(10) Patent No.: US 7,590,359 B2
(45) Date of Patent: Sep. 15, 2009

(54) OPTICAL COMMUNICATION NODE SYSTEM, ALL-OPTICAL PACKET ROUTING SYSTEM, AND ALL-OPTICAL PACKET ROUTING METHOD AND ALL-OPTICAL PACKET ROUTING NETWORK USING THE NODE AND ROUTING SYSTEMS

(75) Inventors: Byoung-Whi Kim, Daejeon (KR); Hyeong-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 540 days.

(21) Appl. No.: 10/738,570

(22) Filed: Dec. 16, 2003

(65) Prior Publication Data

US 2004/0131046 A1 Jul. 8, 2004

(30) Foreign Application Priority Data

Dec. 23, 2002 (KR) .................. 10-2002-0082854

(51) Int. Cl.
*H04J 14/00* (2006.01)
*H04J 4/00* (2006.01)
*H04J 14/02* (2006.01)
*H04B 10/00* (2006.01)

(52) U.S. Cl. .................. 398/186; 398/202; 398/45; 398/51

(58) Field of Classification Search ............. 398/58–79, 398/100, 70, 51, 45, 186, 202–214; 359/125
See application file for complete search history.

(56) References Cited

U.S. PATENT DOCUMENTS 6,313,771 B1 * 11/2001 Munroe et al. ............. 341/137
6,519,062 B1 * 2/2003 Yoo ............................ 398/49
7,085,499 B2 * 8/2006 Yap et al. ................... 398/183
7,106,967 B2 * 9/2006 Handelman ................. 398/47
7,177,544 B1 * 2/2007 Wada et al. ................. 398/51
2002/0027686 A1 * 3/2002 Wada et al. ................ 359/128
2006/0051092 A1 * 3/2006 Way ........................... 398/79

OTHER PUBLICATIONS p. 192-197 of Opticla Networks, a practical perspective, by Ramaswami, Jul. 2002.*
Francesco Masetti, "Photonic Access Concentrator for ATM Gigabit Switching Fabrics", Journal of Lightwave Technology vol. 13, No. 11, Nov. 1995.*
Garcia, R. "Gigabit Ethernet backbones with active loops", Parallel Processing, International Conference on, 2001.*
Shigeru Kuwano, et al., GbE Transmission Experiment Over 235 km of Installed Fiber Employing Optical Packet Routing Prototype, NTT Network Innovation Laboratories, pp. 267-276.

* cited by examiner

*Primary Examiner*—Ken N Vanderpuye
*Assistant Examiner*—Danny W Leung
(74) *Attorney, Agent, or Firm*—Blakely, Sokoloff, Taylor & Zafman LLP

(57) ABSTRACT

To transfer an optical packet generated from one source communication node system to a destination communication node system without optical-to-electrical or electrical-to-optical conversion in a network having communication node systems connected thereto, the present invention includes: (a) the source communication node system generating a multi-wavelength label by encoding wavelengths; (b) combining the encoded label with a data packet to generate an optical packet, and sending the optical packet to the network; (c) the routing system dividing the optical packet received from the network into a label and data; (d) decoding and analyzing the label; (e) determining the destination communication node system based on the analysis result of the label; and (f) sending the data packet to the destination communication node system.

14 Claims, 8 Drawing Sheets

OPTICAL COMMUNICATION NODE SYSTEM, ALL-OPTICAL PACKET ROUTING SYSTEM, AND ALL-OPTICAL PACKET ROUTING METHOD AND ALL-OPTICAL PACKET ROUTING NETWORK USING THE NODE AND ROUTING SYSTEMS

CROSS REFERENCE TO RELATED APPLICATION

This application is based on Korea Patent Application No. 2002-82854 filed on Dec. 23, 2002 in the Korean Intellectual Property Office, the content of which is incorporated herein by reference.

BACKGROUND OF THE INVENTION (a) Field of the Invention

The present invention relates to an optical communication node system, an all-optical packet routing system, and an all-optical packet routing method and an all-optical packet routing network using the optical communication node system and the all-optical packet routing system. More specifically, the present invention relates to a system and method that transmits optical packets generated from one source communication node system to a destination communication node system without optical-to-electrical or electrical-to-optical conversion in a metro core network having a plurality of communication node systems connected thereto.

(b) Description of the Related Art

With the introduction of optical transmission technologies in a subscriber access network, there has been a tendency towards relieving restriction on the communication distance and hence expanding the service area of the access network to a metro access area. Recently, many studies have been made on the metro core network technology including RPR (Resilient Packet Ring) and light SDH (Synchronous Digital Hierarchy) for connections of different LANs (Local Area Networks) in the metro access area.

As the average communication bandwidth per user increases with the spread of FTTH (Fiber To The Home) communication, an increase in the traffic capacity at the subscriber network is expected to gradually accelerate. Hence, a high-capacity and high-speed packet switching function is needed for switching nodes of the metro core network that matches and connects the subscriber networks.

On the other hand, the all-optical packet routing technology without optical-electrical conversion is being watched with keen interest as an approach to ultimately intensify the metro core network, based on an analysis that the all-optical packet routing technology may enhance the economy of net building cost. The NTT (Nippon Telegraph and Telephone) suggested an all-optical packet routing optical subscriber network that transfers packets in the units of wavelength using AWG (Arrayed Waveguide Grating) [Ref: ISSLS2002]. If not opening the method to the public, the BTexact adapts the all-optical packet routing technology for the economy of the subscriber network.

All-optical packet routing has been so far considered as impractical because there is no optical buffer (optical memory), and OBS (Optical Burst Switching) technology has been studied to avoiding use of optical buffers.

However, this technology is still in the early state of research and is considered to be applicable only to extremely limited applications due to its unsolvable problems when actually applied to the network.

Until now, various ideas for implementation of the all-optical switching technology have been presented in literature at the experimental level. These approaches are mostly confined to a basic method of optical packet switching rather than implementation of systems or networks.

In recent years, a few studies have been made on an all-optical routing method of optical packets using a combination of existing optical technologies realizable in a network comprised of a plurality of communication nodes. The related art was disclosed in a paper recently presented at the ISSLS2002 by the NTT, which suggests a method of all-optical routing of optical packets from an OLT (Optical Line Terminal) located at a CO (Central Office) for the use purpose in a metro core network to an ONU (Optical Line Unit) adjacent to the user. This method, passing tests on a test bed, is considered as most realizable, as compared with the existing methods presented at various experimental levels.

FIG. 1 schematically illustrates the concept of the prior art.

The prior art of FIG. 1 is a typical WDM-PON (Wavelength Division Multiplex-Passive Optical Network) structure. An OLT sends n wavelength signals towards ONUs, and a WDM router (or WGR (Waveguide Grating Router)) routinely distributes assigned wavelengths to respective ONUs according to AWG routing mechanism. Uplink wavelengths transferred from ONUs to OLT differ from downlink wavelengths transferred from OLT to ONUs. The respective uplink wavelengths are designated to each of ONUs. Different uplink wavelengths are multiplexed at the WGR and sent to the OLT.

The downlink communication, which is achieved in the units of a super frame containing 32 frames, is a communication method of transferring a corresponding frame to a desired ONU by designating wavelengths by frames in the super frame and routinely distributing the designated wavelengths by the AWG. In the paper, the total number of wavelengths for 16 ONUs is 32, i.e., 16 downlink wavelengths (channels) plus 16 uplink wavelengths, and the number of frames assigned to a channel in the super frame is at most 8. If uniformly distributed, two frames per channel are allocated. The downlink has a data rate of 1.9907 Gbps, and for 32 frames, the data rate per frame is 62.2 Mbps (=1.9907 Gbps÷32). Hence, the data rate per channel is variable in the range of 62.2 to 497.7 Mbps in the units of 62.6 Mbps. Contrarily, the uplink has a fixed data rate of 497.7 Mbps per wavelength.

The ONUs use a light source having a fixed wavelength for uplink communication, but the OLT uses a light source having a high-speed wavelength converting. For this purpose, the paper proposes the use of an SSG-DBR (Super Structure Grating Distributed Bragg Reflector) LD (Laser Diode) that has a wavelength tuning range of 30 nm and a wavelength converting speed of 10 to 100 ns.

The prior art of this method is an all-optical structure that combines a high-speed wavelength conversion function of the OLT with a passive wavelength distribution function of the AWG to distribute packets to the respective ONUs in a simple way. This structure has a function of changing the downlink bandwidth to the ONUs dynamically within a defined range.

Compared with the general WDM-PON structure that connects the OLT to the individual ONUs with designated uplink/downlink wavelengths in the form of a dedicated path, the structure of the prior art divides the OLT output bandwidth by the number of ONUs connected to the OLT to determine an average downlink bandwidth per ONU. So, the structure uses the same number of wavelengths as the general WDM-PON structure but has a greater reduction of the downlink bandwidth.

The prior art is characterized in that uplink traffic is greater than downlink traffic, while the Internet service network usually has downlink traffic several to several scores of times greater than uplink traffic. Compared with the general WDM-PON in which the transmission rate per wavelength can be raised up to 10 Gbps at the current technological level, the prior art has the difficulty in packet transmission in a more than Gbps level because of the restriction on the wavelength change rate.

Moreover, the prior art is not practical in the aspect of cost, because an expensive wavelength-tunable light source just out on the market is used to make the downlink bandwidth variable for the packet transferred to the ONUs.

SUMMARY OF THE INVENTION

It is an advantage of the present invention to perform all-optical routing of optical packets with a code comprised of multiple wavelengths, instead of using an optical buffer or an FDL (Fiber Delay Line), without electrical-to-optical or optical-to-electrical conversion for data optical packets in transferring optical packets through switching nodes constituting a metro core network.

It is another advantage of the present invention to perform all-optical routing irrespective of the data rate.

In one aspect of the present invention, a communication node system, which generates an optical packet in a metro core network having a plurality of communication nodes connected thereto, the communication node system comprises: an optical frame generating and wavelength multiplexing section for generating data and a primitive code, and wavelength-multiplexing the generated data and primitive code; an encoding section for encoding the primitive code according to a destination communication node, and attaching the encoded code to the data to generate an optical packet; and an optical amplifier for amplifying the optical packet and outputting the amplified optical packet to the network.

The optical frame generating and wavelength multiplexing section comprises: m light sources for generating the primitive code; a data light source for generating a data optical signal; m modulators for modulating the primitive code to generate a code optical pulse signal, when using an external modulation method; a data modulator for modulating the data to generate data optical bits, when using the external modulation method; and an optical multiplexer for wavelength-multiplexing the code optical pulse signal and the data optical bits, a group of wavelengths for the primitive code being shared by all the communication nodes, a wavelength of the data optical signal being designated uniquely from communication node to communication node, the wavelengths of the primitive code using a different wavelength band from the wavelengths for the data optical signals.

The encoding section comprises a plurality of encoders, each encoder comprises: a circulator for circulating an input optical signal in a definite direction, and outputting the optical signal; and a BG (Bragg Grating) for encoding the optical signal output from the circulator, the BG having a plurality of grating sections which reflect a uniquely designated wavelength, the grating sections being formed at designated intervals, the number of grating sections being m+1, wherein m is the number of wavelengths constituting the code and 1 is one additional wavelength for data.

The grating sections of the BG are divided into a plurality of code sections for encoding the code, and a data section for encoding the data, the data section being positioned after the code sections from the entrance of BG.

A group of code sections and the data section are apart from each other by a distance given by the following equation:

$$L_G = T_R/2(c/n)$$

wherein c is a velocity of light; n is a refractive index of an optical path; $T_R$ is a routing control time; and $L_G$ is a spatial distance between a group of code sections and the data section.

The communication node system further comprises: an optical switching section comprising a plurality of optical switches for coupling the data and the primitive code output from the optical frame generating and wavelength multiplexing section to one of the encoders of the encoding section according to a destination, the optical switches being operated in a 1×(k−1) form, wherein k is the number of communication nodes connected to the network.

The data includes a preamble inserted therein to secure stable switching by providing a further timing margin for routing control in addition to $T_R$.

In another aspect of the present invention, an all-optical packet routing system, which transfers an optical packet generated from one source communication node to a destination communication node in a metro core network having a plurality of communication nodes connected thereto, the all-optical packet routing system comprises: a packet divider for dividing the optical packet input through the network into a header corresponding to a code and a payload corresponding to data; a header reproducer for wavelength-multiplexing the header and reproducing the wavelength-multiplexed header into n identical signals, wherein n is the number of codes used in the whole network; a decoding section for analyzing the n reproduced header copies; a switching section for switching the payload output from the packet divider to a designated output port according to an analyzed output of the decoding section; a wavelength converting section for wavelength-converting the payload output from the switching section to a wavelength designated by output ports; and a wavelength multiplexer for wavelength-multiplexing the wavelength-converted payload, regulating an intensity of the wavelength-multiplexed payload, and outputting the intensity-regulated payload to the network, thereby feeding the payload into the destination communication node.

The packet divider comprises a wavelength demultiplexer (WDUX), the optical packet input from the demultiplexer being divided by wavelengths into a header and a payload.

The decoding section comprises n decoders, the n reproduced header copies being simultaneously fed into the n decoders, respectively, wherein n=k×(k−1); and k is the number of communication nodes connected to the network.

The decoder comprises: a circulator for circulating an optical signal corresponding to the input header in a definite direction; and an BG for decoding the optical signal output from the circulator, the BG having a plurality of grating sections for reflecting optical signals of different wavelengths, the grating sections being positioned at designated intervals, the grating sections being arranged in the reverse order of the grating sections of the BG used for encoding the optical signal, the intensity of a signal output from the BG being varied according to whether or not a wavelength arrangement order of the input optical signal is reversely matched to an arrangement order of the grating sections.

The optical signal corresponding to the header comprises m optical pulses having different wavelengths, the intensity of the optical signal output from the BG being at maximum and ideally m times as high as the intensity of a single pulse, when the wavelength arrangement order of the optical signal is reversely matched to the arrangement order of the grating sections.

The all-optical packet routing system further comprises: a switching controller comprising a plurality of intensity determiners coupled to the respective decoders of the decoding section, the intensity determiner comprising: a photodetector for converting an input optical signal into an electrical signal; and a determiner for determining a destination of the payload based on the detected intensity of the optical signal.

The switching section comprises a three dimensional (3D) payload switch, the 3D payload switch comprising a plurality of switching planes for performing routing of the payload, the number of switching planes being k, the number of communication nodes connected to the network, each switch having k−1 output ports.

Each switching plane of the 3D payload switch is in a one-to-one correspondence with the source communication node, each output port of the switching plane being coupled to one destination communication node.

The number of codes required for marking a connection between the source communication node and the destination communication node is n=k×(k−1), the wavelength converting section comprising k×(k−1) wavelength converters for wavelength-converting the input payload to a wavelength designated by output ports, wherein k is the number of communication nodes connected to the network.

In still another aspect of the present invention, an all-optical packet routing network, which transfers an optical packet in a metro core network, the all-optical packet routing network comprises: at least three communication node systems; and a routing system, wherein the communication node system comprises: an optical frame generating and wavelength multiplexing section for generating data and a primitive code, and wavelength-multiplexing the generated data and primitive code; an encoding section for encoding the primitive code according to a destination communication node, and attaching the encoded code with the data to generate an optical packet; and an optical amplifier for amplifying the optical packet to be transmittable, and outputting the amplified optical packet to the network, wherein the routing system comprises: a packet divider for dividing the optical packet received from the communication node system via the network into a header corresponding to the code and a payload corresponding to the data; a header reproducer for wavelength-multiplexing the header, and reproducing the wavelength-multiplexed header into n identical signals, wherein n is the number of codes used in the whole network; a decoding section for analyzing the n reproduced header copies; a switching section for switching the payload output from the packet divider to a designated output port according to an analyzed output of the decoding section; a wavelength converting section for wavelength-converting the payload output from the switching section to a wavelength designated by output ports; and a wavelength multiplexer for wavelength-multiplexing the wavelength-converted payload, regulating an intensity of the wavelength-multiplexed payload, and outputting the intensity-regulated payload to the network, thereby feeding the payload into the destination communication node.

The number of wavelengths of the code is m and the number of all the communication node systems connected to the network is k, k×(k−1) wavelengths are used for transmission of the payload, and the total number of codes used in the whole network being given as n=k×(k−1).

In still yet another aspect of the present invention, an all-optical packet routing method, which is for a routing system transferring an optical packet generated from one source communication node system to a destination communication node system in a metro core network having a plurality of communication node systems connected thereto, the all-optical packet routing method comprises: (a) the source communication node system generating a multi-wavelength primitive code and encoding the generated primitive code; (b) the source communication node system combining the encoded label with a data packet to generate an optical packet, and sending the generated optical packet to the network; (c) the routing system dividing the optical packet received from the network into a label and data; (d) the routing system decoding and analyzing the label; (e) the routing system determining the destination communication node system based on the analysis result of the label; and (f) the routing system sending the data packet to the destination communication node system.

The step (f) comprises: the routing system converting the data to different wavelengths according to destination communication nodes, k×(k−1) wavelengths being used for transmission of the data, wherein k is the total number of communication nodes connected to the network.

The number of wavelengths used in encoding the label in the step (a) is m, the total number of wavelengths used in transmission of the optical packet is k×(k−1)+m, the total number of codes used in the whole network being n=k×(k−1).

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention.

Accordingly, the drawings and description are to be regarded as illustrative in nature, and not restrictive.

To compensate for the shortcomings of the prior art and achieve the above-mentioned advantages of the present invention, the embodiment of the present invention is directed to a method for all-optical routing of optical packets using an optical label comprised of a plurality of wavelengths in the same manner as the traditional MPLS (Multi Protocol Label Switching) for label-switching the packets in a network of electrical routing systems. For this purpose, the all-optical routing conditions are as follows:

(1) Optical packets should be all-optically routed using an optical header, without electric-optical conversion and an optical buffer or an FDL;

(2) Different types of codes are generated with a limited number of wavelengths; and (3) Data rate is restrained only by the physical transmission capacity rather than by the processing capacity of electronic equipment.

To meet these conditions, the present invention performs encoding with multiple-wavelength labels, decoding of multiple-wavelength labels, all-optical table lookup, all-optical payload switching, and wavelength conversion of optical payloads.

Figure 1:
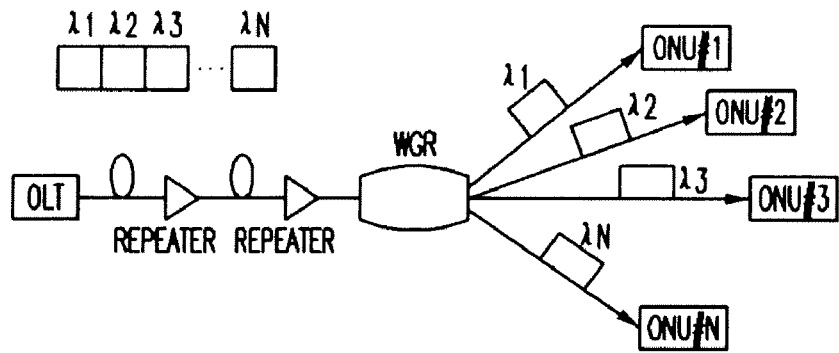
FIG. 1 is a schematic diagram of an all-optical packet routing network structure according to prior art.
Figure 2:
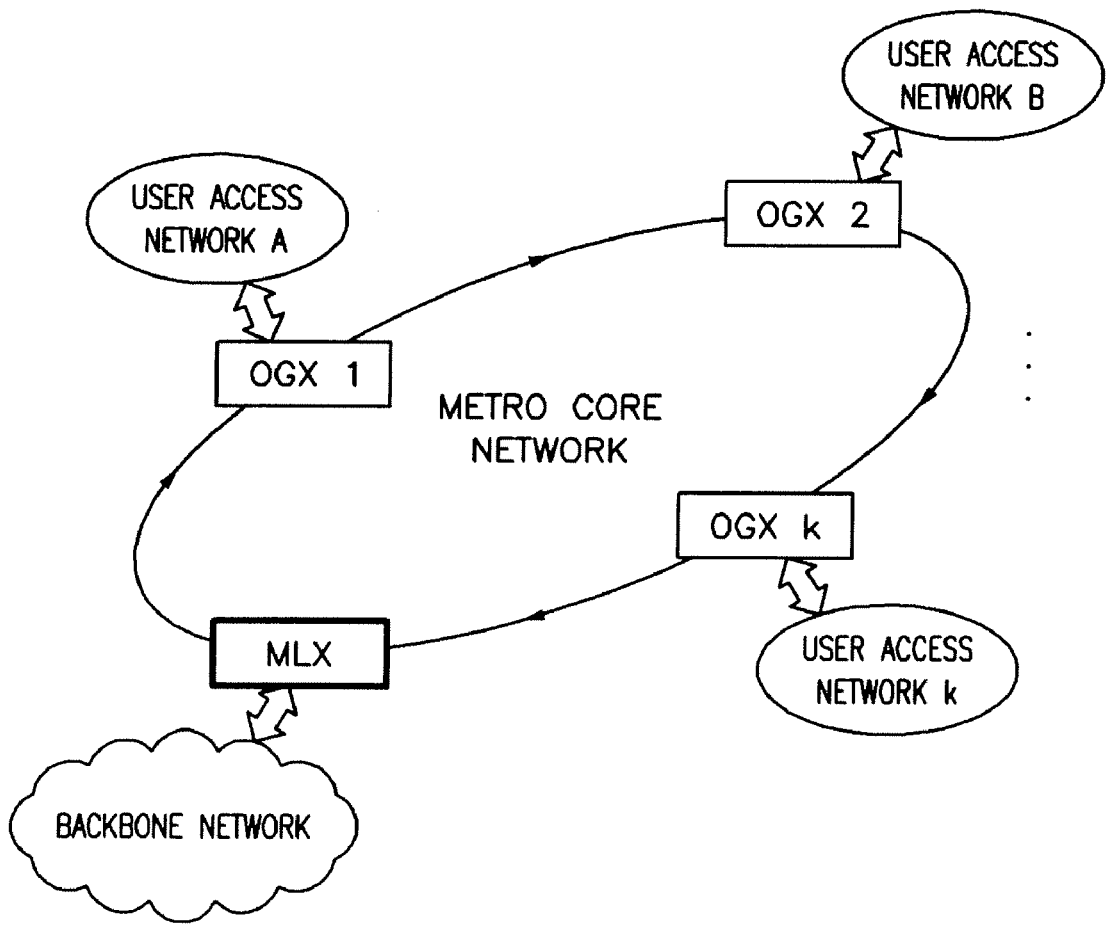
FIG. 2 is a conceptual diagram of a metro core network adapting all-optical routing in accordance with an embodiment of the present invention.

FIG. 2 illustrates the concept of a metro core network using an all-optical routing method according to the embodiment of the present invention that satisfies the above requirements.

Expediently, the optical communication node system of the metro core network for matching a subscriber network is called "OGX" (Optical Gigabit Switch), and the control node (all-optical packet routing system) for all-optical routing of optical packets between OGXs in a ring network comprised of OGXs is called "MLX" (Multi-Lambda Switch).

The metro core network, i.e., the all-optical packet routing network according to the embodiment of the present invention comprises, as shown in FIG. 2, a plurality of OGXs (OGX1 to OGXk) connected in a ring network, and an MLX that performs routing of the optical packets generated from the OGXs.

Figure 3:
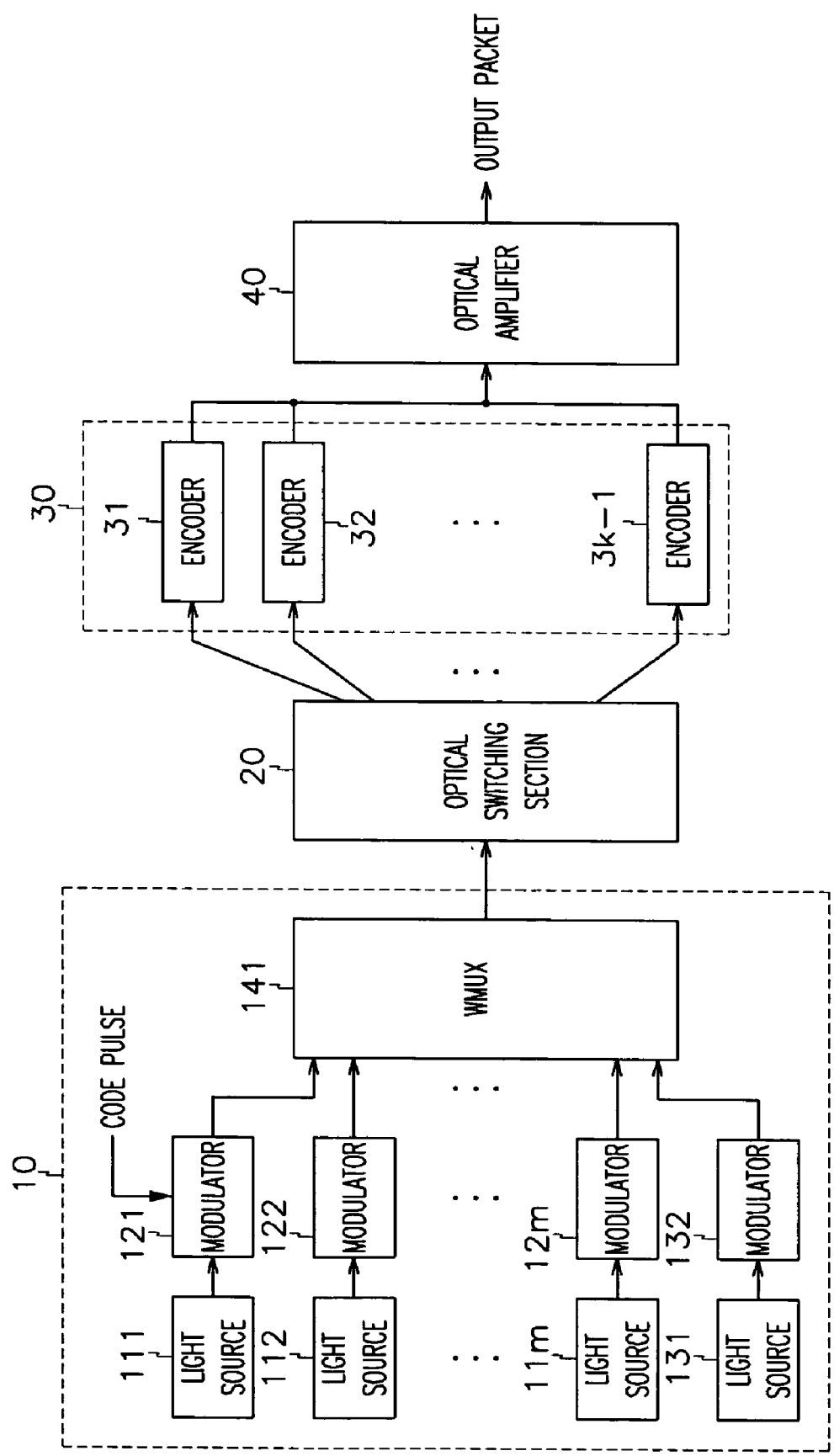
FIG. 3 is a structural diagram of an optical communication node system according to the embodiment of the present invention.

FIG. 3 shows the structure of an optical communication node system OGX according to the embodiment of the present invention.

The OGX according to the embodiment of the present invention generates (encodes) a multi-wavelength label, attaches the label to a data packet (payload), and sends the label-attached data packet to the all-optical packet routing system, MLX. For this purpose, the OGX comprises, as shown in FIG. 3, an optical frame generating and wavelength multiplexing section 10 for generating data and a primitive code (i.e., non-coded optical pulses), and wavelength-multiplexing them; an optical switching section 20 for selecting an encoding type; an encoding section 30 for encoding the primitive code by a selected code type, and combining the encoded primitive code (header) with data (payload) to generate an optical packet; and an optical amplifier 40 for performing intensity control and amplification of the optical packet, and uniformly outputting the processed optical packet with a designated optical power level.

The optical frame generating and wavelength multiplexing section 10 comprises, if the code (primitive code) comprises m wavelengths, m light sources 111 to 11$m$ for generating optical pulses as a non-encoded primitive code; a data light source 131 for generating a data optical signal; m modulators 121 to 12$m$ for modulating the light to generate a code optical pulse signal, when using an external modulation method; a data modulator 132 for modulating the data optical signal to generate data optical bits, when using the external modulation method; and a WMUX (Wavelength Multiplexer) 141 for wavelength-multiplexing the generated code optical pulse and data optical bits.

The optical switching section 20 provides connection to a corresponding encoder of the encoding section 30 so as to encode the wavelength-multiplexed primitive code according to destinations. Here, the optical switching section 20 performs 1×(k−1) switching operations, where k is the number of OGXs connected to the network.

The encoding section 30 comprises a plurality of encoders 31 to 3k−1, each of which includes a circulator C and an BG (Bragg Grating) and generates an optical packet as a combination of the encoded code and the data packet.

The optical amplifier 40 is coupled to the individual encoders 31 to 3k−1 through an optical path coupler to receive optical packets, regulates the intensity of the optical packets generated from the respective encoders 31 to 3k−1 to an appropriate level for transmission, and outputs the intensity-controlled optical packets to the network.

Figure 4:
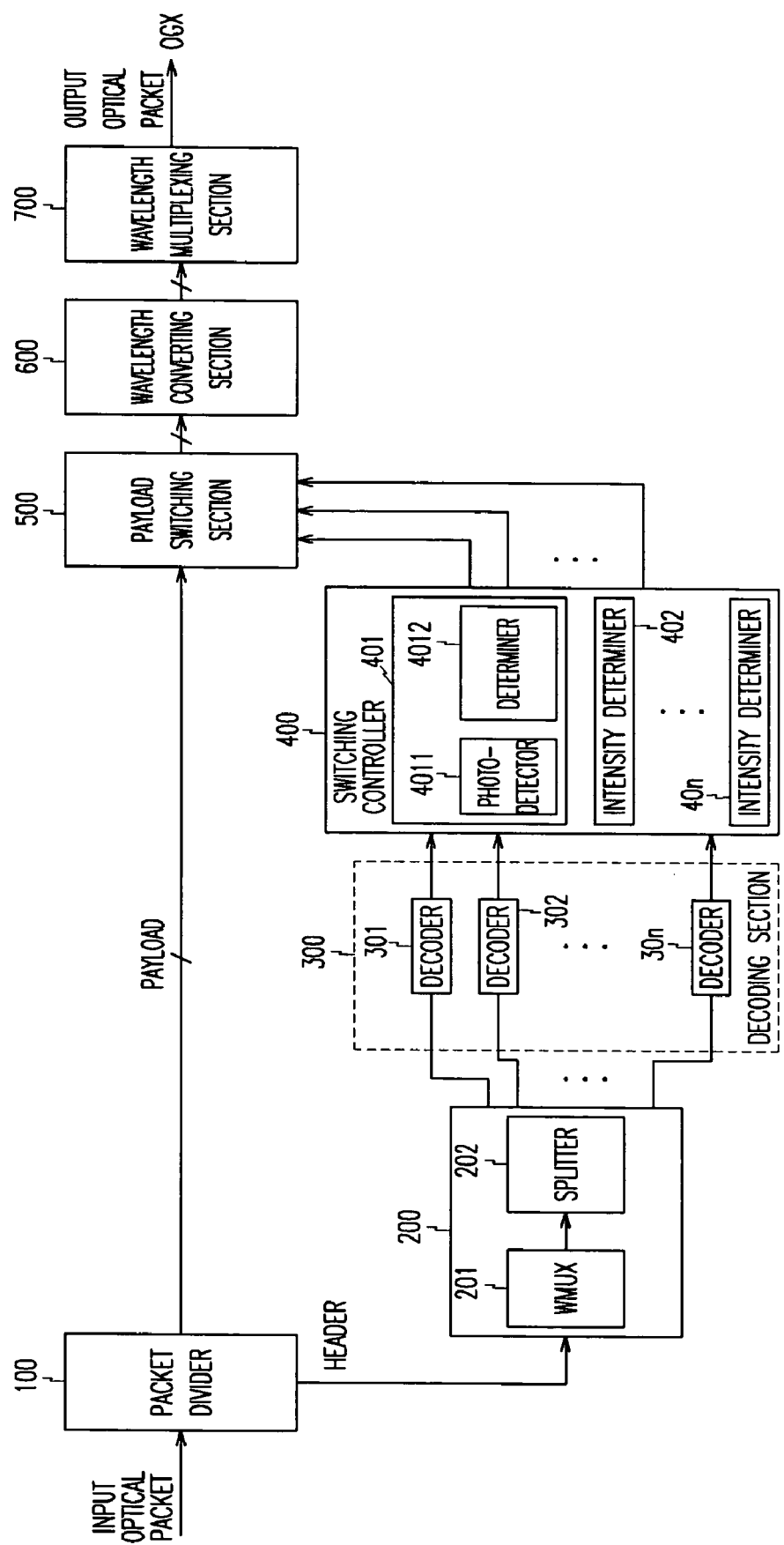
FIG. 4 is a structural diagram of an all-optical packet routing system according to the embodiment of the present invention.

FIG. 4 shows the structure of a MLX for routing optical packets generated from the OGXs as constructed above.

The MLX divides the input optical packet into a multi-wavelength label (header) and data (payload), decodes the label, and controls a payload optical switch based on the decoded label so as to transfer the data packet to a destination OGX. For this purpose, the MLX according to the embodiment of the present invention comprises, as shown in FIG. 4, a packet divider 100 for dividing an input optical packet into a header and a payload; a header reproducer 200 for wavelength-multiplexing the header and reproducing the multiplexed header into n identical signals; a decoding section 300 for decoding the n header copies; a switching controller 400 for analyzing header information from the output of the decoding section 300; a switching section 500 for switching the payload to a designated output port based on the analyzed header information; a wavelength converting section 600 for wavelength-converting an optical signal corresponding to the payload to a designated wavelength by switch output ports; and a wavelength multiplexing section 700 for wavelength-multiplexing the wavelength-converted optical signal, controlling the wavelength-multiplexed optical signal to have an optical intensity suitable for transmission, and outputs the intensity-controlled optical signal to the final destination.

Here, a WDUX (Wavelength Demultiplexer) is used as the packet divider 100.

The header reproducer 200 comprises a WMUX 201 for wavelength-multiplexing the header; and a splitter 202 for reproducing the header into n header copies.

The decoding section 300 comprises a plurality of decoders 301 to 30$n$, each of which is comprised of a circulator and a BG. Here, the grating sections of the BGs of the decoders 301 to 30$n$ are arranged in the reverse order of those of the BGs of the encoders 31 to 3k−1.

The switching controller 400 comprises a plurality of intensity determiners 401 to 40$n$ coupled to the decoders 301 to 30$n$, respectively. Each of the intensity determiners 401 to 40$n$ comprises a photodetector 4011 (i.e., a photodiode as used herein) for converting an input optical signal into an electrical signal; and a determiner 4012 for determining a destination based on the detected optical signal.

The switching section 500 comprises a 3D payload switch comprised of a plurality of switching planes for performing payload routing. The number of switching planes is equal to "k", the number of OGXs connected to the network, and the number of output ports of each switching plane is "k−1", the number of OGXs other than the OGX concerned. Accordingly, each switching plane (i.e., the plane receiving the data optical signal) is in a one-to-one correspondence with the origination OGX, and each output port of a switching plane means the corresponding destination OGX.

The wavelength converting section 600 converts a wavelength used for payload transmission from the origination OGX to the MLX to a designated wavelength by output ports of each switching plane, so as to prevent a collision of payloads possibly occurring when simultaneously transmitting packets from the output ports of k−1 switching planes to a same destination OGX.

The wavelength multiplexing section 700, comprised of a WMUX, multiplexes the wavelength of the optical signal output from the wavelength converting section 600, and sends the wavelength-multiplexed output optical packet to the network.

Now, a description will be given as to an all-optical packet routing method according to the embodiment of the present invention based on the OGXs and the MLX as constructed above.

Figure 5:
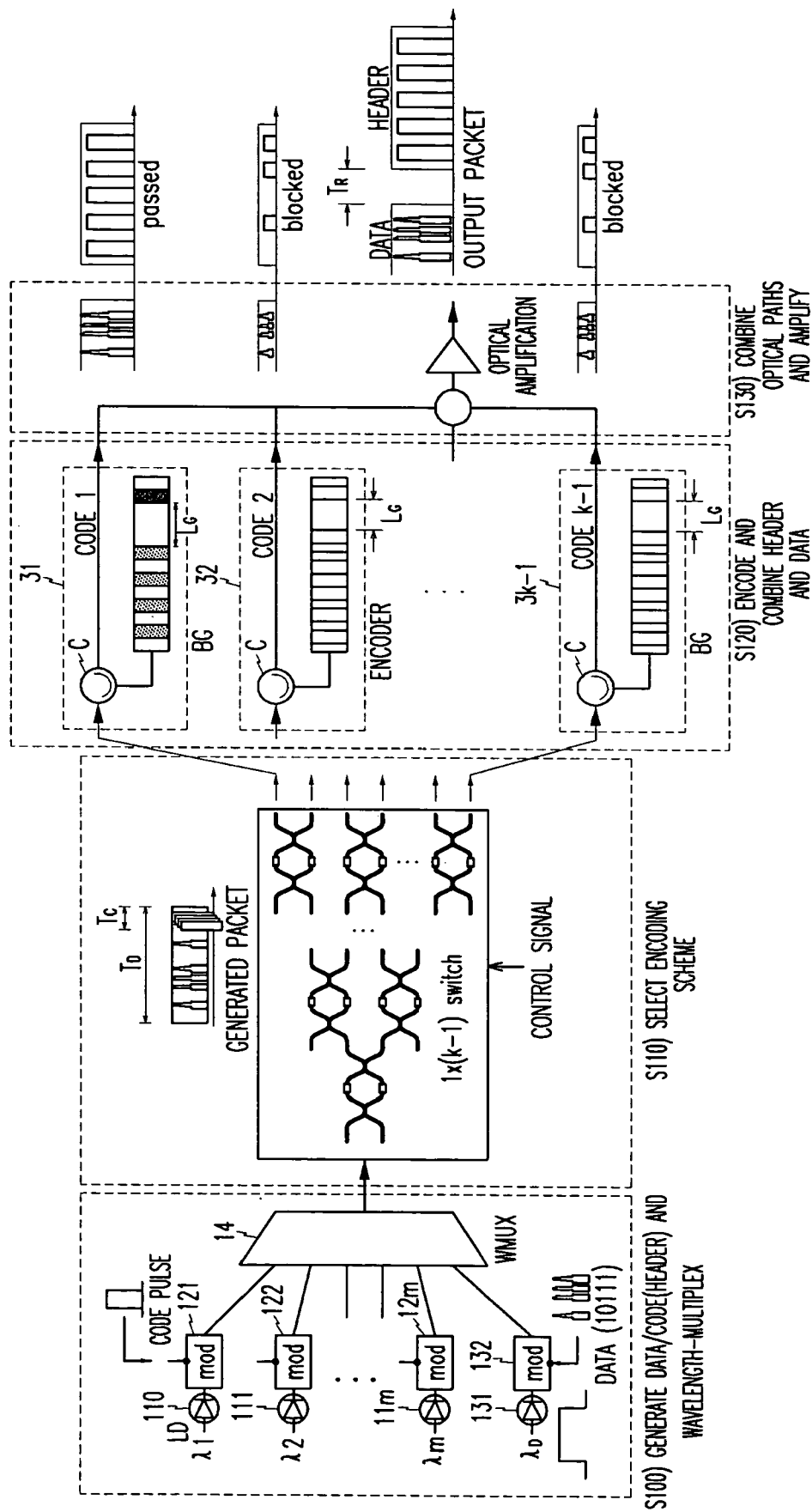
FIG. 5 is a diagram showing an encoding process according to the embodiment of the present invention.

FIG. 5 sequentially shows an operation of the origination OGX.

As illustrated in FIG. 5, the light sources 111 to 11$m$ of the optical frame generating and wavelength multiplexing section 10 generate optical signals for codes, i.e., m primitive codes, and the data light source 131 generates a data optical signal.

The code wavelengths use a different wavelength band from the data wavelengths. The code wavelengths are shared by all the OGXs, while the data wavelengths are designated uniquely to each of OGXs.

In the case of using an external modulation method, each code optical signal is modulated by the respective modulators 121 to 12$m$ positioned after the light sources and output as a pulse signal having a pulse width of $T_c$, while the data optical signal is modulated by the data modulator 132 and output as data optical bits.

The code optical pulses comprised of multiple wavelengths, and the data optical bits are wavelength-multiplexed by the optical multiplexer 141, in step S100.

The primitive code optical pulses and the data optical bits thus generated and wavelength-multiplexed are transferred to a designated encoder of the encoding section 30 by the optical switching section 20 for the sake of encoding the code designated by destinations.

The origination OGX controls the optical switch for encoding per data packet so as to generate a code corresponding to the destination OGX, and inserts a preamble in the data packet for further stable switching operation in consideration of the switching rate of the switch.

The wavelength-multiplexed primitive codes and data optical bits are fed into the encoder corresponding to the destination OGX through the optical switching section 20, in step S110.

The optical signals (wavelength-multiplexed primitive codes and data optical bits) fed into the encoder (e.g., the one denoted by reference numeral 31) are input to the circulator C, which circulates the optical signals in a definite direction. Thus the optical signals corresponding to the wavelength-multiplexed primitive codes and data optical bits are fed into the BG.

The BG grating sections include m grating sections of as many as the wavelengths constituting the code plus one grating section for reflection of the data wavelength. Namely, the number of BG grating sections is m+1. The wavelength is temporally isolated by as much as the time for the optical signal reciprocating the spatial inter-distance between the grating sections in the optical path, so the grating section distance is regulated so as to readily decode the temporally isolated code wavelengths at the receiver.

The header is positioned temporally before the data, so the grating section (i.e., data grating section) for generating data must be positioned after the grating sections (i.e., code grating sections) for generating codes, and sufficiently apart from the code grating sections. This is for providing a temporal room large enough for code decoding, payload optical switch control, or other operations necessary for all-optical routing of the data (payload) at the receiver (MLX). Namely, when control for the payload routing at the MLX is achieved within $T_R$, the distance is regulated to $L_G = T_R/2(c/n)$, where c is the velocity of light, n is the refractive index of the optical path, and $L_G$ is the spatial distance between the code grating sections and the data grating section.

The combination of the coded code and data packet generated by BG reflection is circulated in a definite direction via the circulator C and output from the encoder 31, in step S120. The encoding process will be described later in detail.

The optical packets (in the form of a combination of the coded code and the data packet generated from the encoding section 30) are fed into the optical amplifier 40 via the optical path coupler, and the optical amplifier 40 regulates the light intensity of the optical packets to an appropriate level for transmission, and outputs the optical packets to the network, in step S130.

The optical packets output to the network are transferred to the MLX and then fed into the destination OGX by all-optical packet routing.

Figure 6:
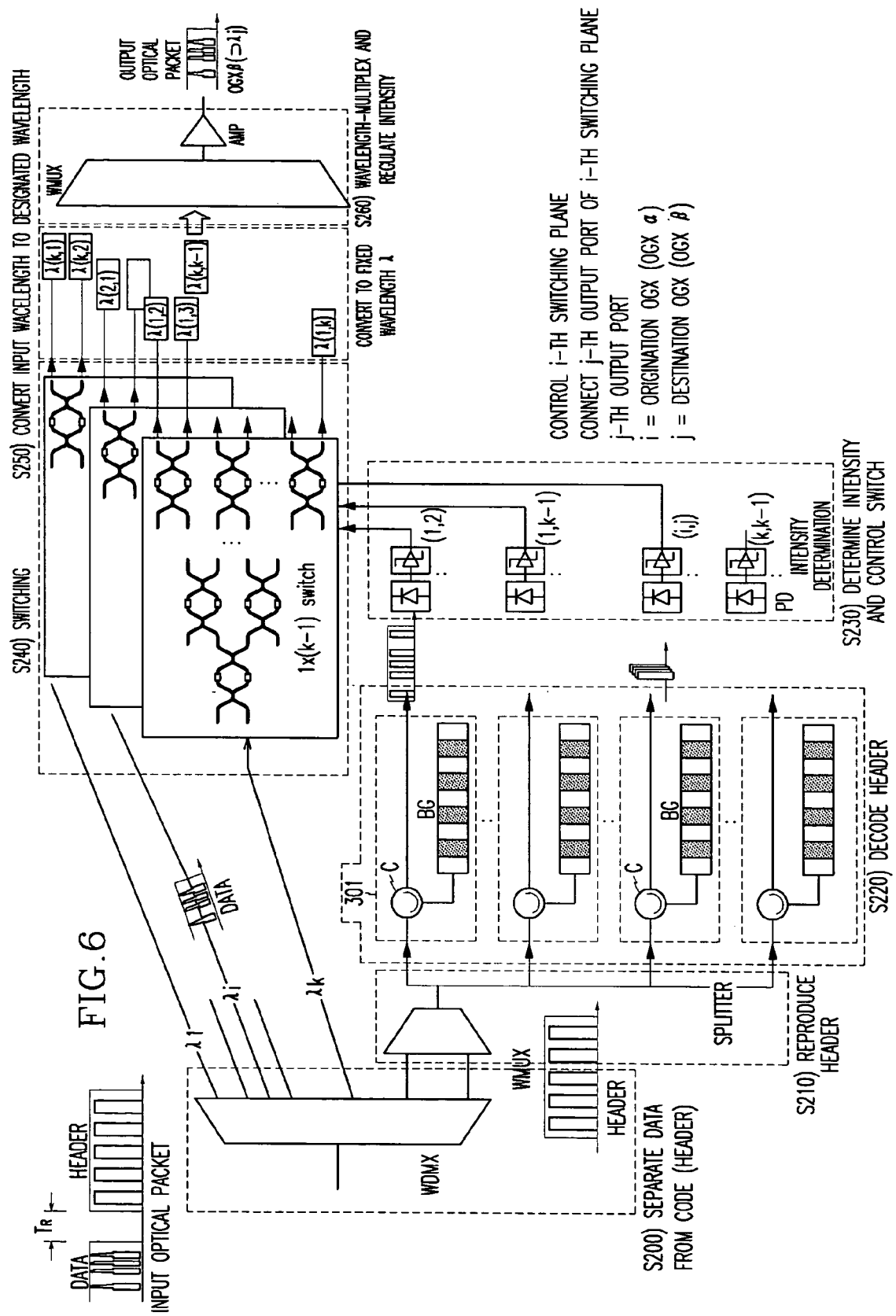
FIG. 6 is a diagram showing an all-optical packet routing process according to the embodiment of the present invention.

FIG. 6 sequentially shows an operation of the MLX.

Here, the MLX divides the input optical packet into a code (header) and data (payload), decodes the code, and performs all-optical routing so as to transfer the data packet to the destination OGX based on the decoded information.

As illustrated in FIG. 6, the optical packet fed into the packet divider 100 of the MLX from the network comprises a header containing a wavelength-multiplexed code, and a payload containing data information combined with the header behind at a time interval of $T_R$.

The time interval is a required time for extracting header information by optical table lookup and controlling the payload optical switch based on the header information so as to perform all-optical routing. The time interval should be properly provided as described above.

The input optical packets are classified by wavelengths at the wavelength demultiplexer WDMX of the packet divider 100, and divided into payload wavelengths and header wavelengths. Each payload wavelength is fed into one of the k optical switching planes (constituting a 3D payload switch) designated by wavelengths of the switching section 500, in step S200.

The header wavelengths are fed into the header reproducer 200 and converted to a wavelength-multiplexed at the wavelength multiplexer WMUX 201. The wavelength-multiplexed header is copied into n identical signals at the splitter 202 and simultaneously fed into all the decoders of the decoding section 300, in step S210.

The input optical signal is fed into the BG in a definite direction via the circulator C of a decoder (e.g., the one denoted by reference numeral 301). When the grating sections of the BGs of the decoder 301 are arranged in the reverse order of those of the BGs of the encoder 31, the multi-wavelength pulses temporally distributed are concentrated in the same time interval in the same principle as encoding. Ideally, the concentrated pulses have a light intensity increased by as much as m times rather than a single pulse, where m is the number of optical pulses constituting the header. When the grating sections of the BGs of the decoder 301 are not arranged in the reverse order of those of the BGs of the encoder 31, the optical pulses are not accurately concentrated in a same single pulse interval and have a weaker light intensity relative to the case where the grating sections of the BG of the decoder 301 are arranged in the reverse order of those of the BG of the encoder 31, in step S220.

Figure 7:
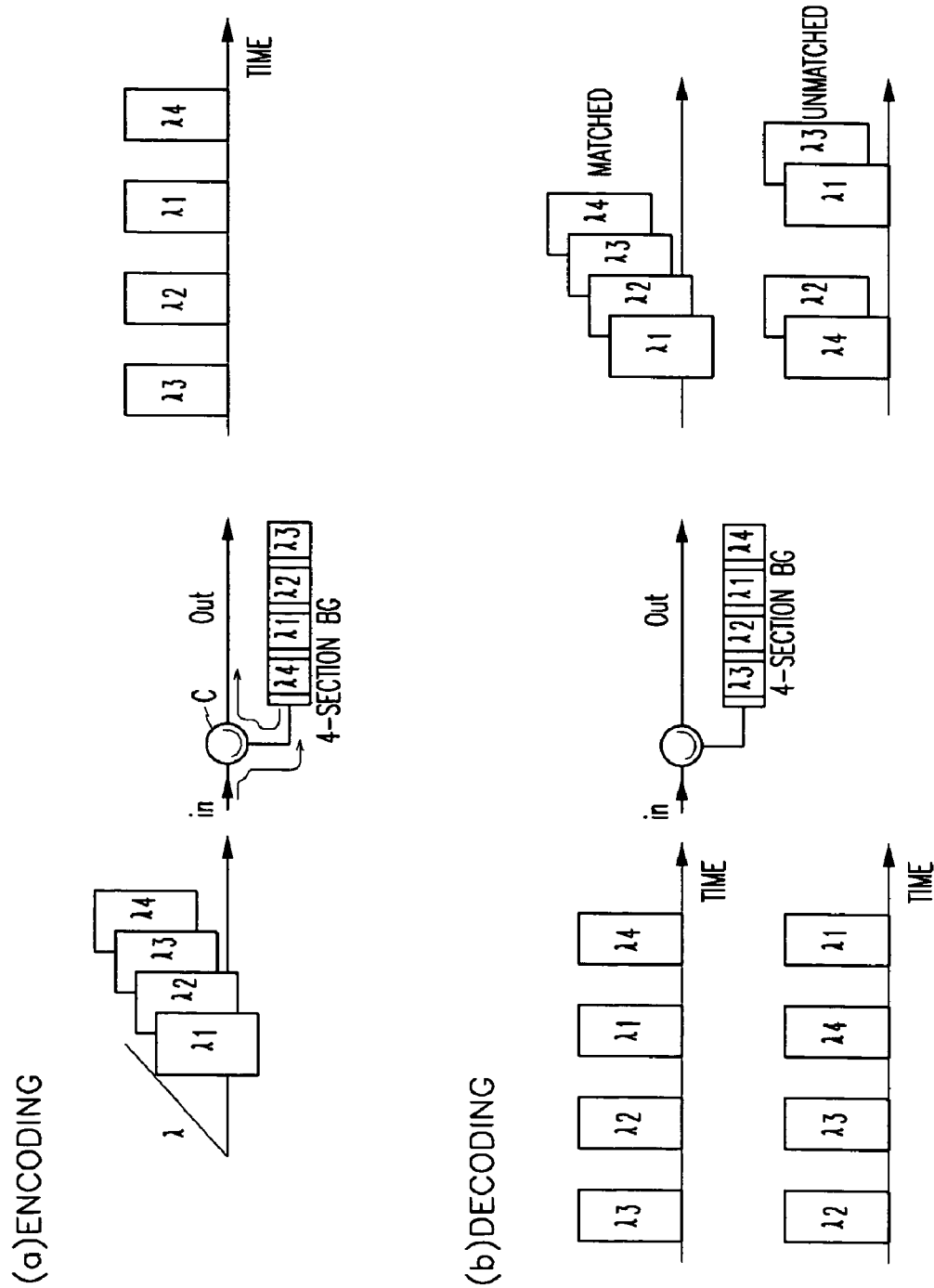
FIG. 7 is a diagram explaining an encoding/decoding process according to the embodiment of the present invention.

FIG. 7 illustrates the principle of encoding and decoding according to the embodiment of the present invention in further detail.

As stated above, the embodiment of the present invention involves generating (encoding) codes from a plurality of wavelengths based on the BG element and the circulator, and decodes the generated codes. FIG. 7 shows an example of using four different wavelengths.

The BG has a corresponding grating section to every wavelength involved in the encoding. Each grating section has a plurality of gratings distributed at designated intervals in the optical path, which interval determines the wavelength to be reflected. Therefore, only a desired wavelength is reflected in the respective sections and the others are passed through. It takes time for a wavelength to pass from one grating section to another, so, as illustrated in FIG. 7(*a*), when a plurality of wavelengths aligned at a same time line are fed into the BG and reflected, they are temporally spread from one another by a time interval twice as long as the time required for passing from one grating section to the next. Here, the operational principle of the multi-section BG is well known to those skilled in the related art and will not be described in detail. By changing the arrangement order of the grating sections using the operational principle of the BG, the wavelength pulses can be arranged at designated time intervals to generate codes, as shown in FIG. 7(*a*).

The encoded codes are decoded at the decoder 301 of the MLX. In the decoding process, the same BG and circulator as used in the encoding process are employed, but the decoding process is the reverse of the encoding process.

It is assumed, for example, that the encoded codes are fed into the BG having grating sections arranged in the reverse order of encoding. If the wavelength arrangement order of the input codes are matched to the arrangement order of the grating sections of the BG, in which matched case the pulses temporally spread are concentrated in one pulse time, then the intensity of wavelength pulses becomes four times as high as that of a single pulse according to the above-stated function of the BG. Otherwise, if the wavelength arrangement order of the input codes are unmatched to the arrangement order of the grating sections of the BG, then the optical pulses do not completely overlap temporally as in the "unmatched" case of FIG. 7(*b*) and the intensity becomes much lower, compared with the "matched" case. Accordingly, the decoding can be achieved by measuring the intensity of the optical pulses during a defined time interval.

Figure 8:
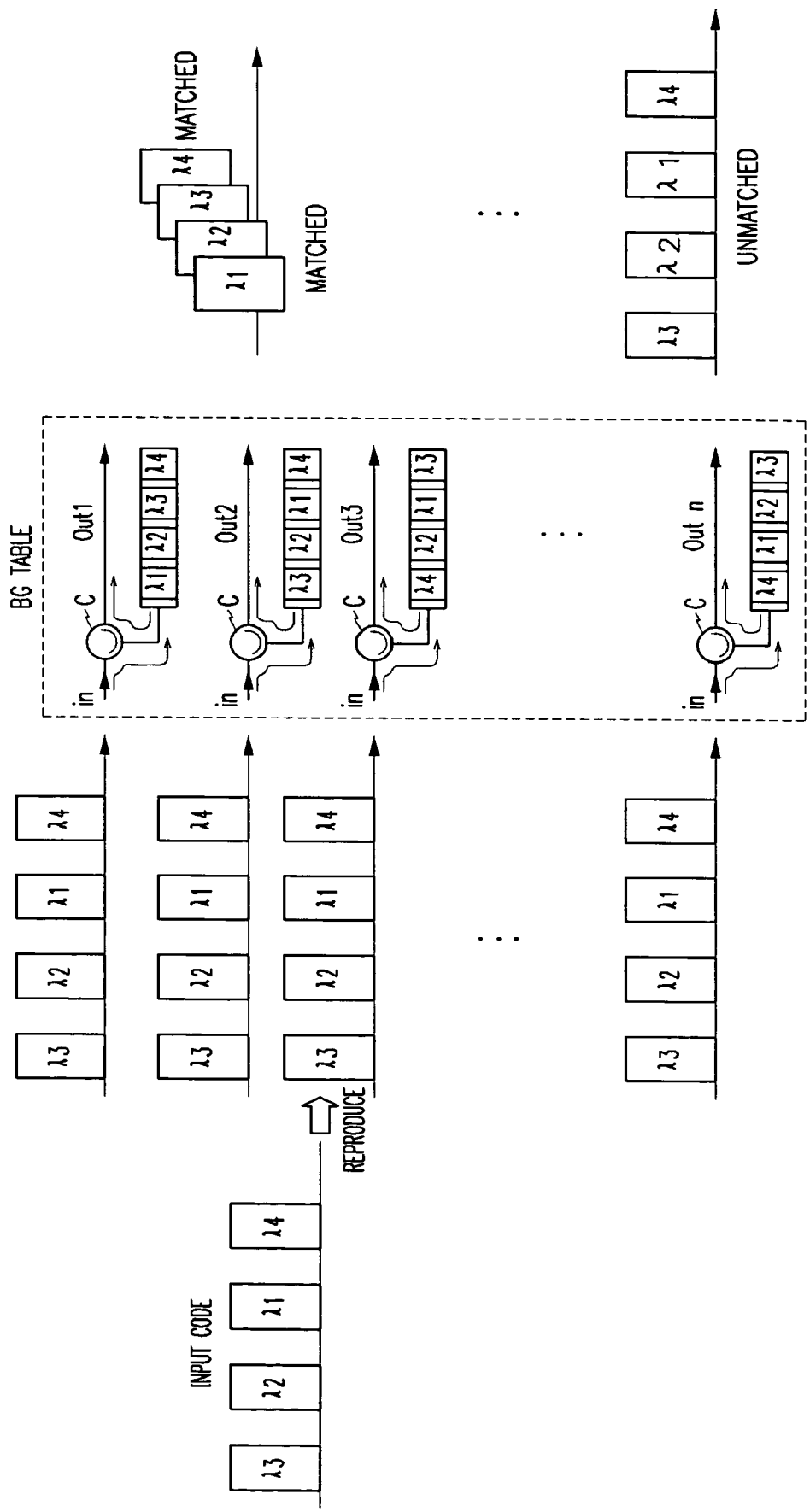
FIG. 8 is a diagram of an all-optical lookup table according to the embodiment of the present invention.

FIG. 8 is a conceptual diagram explaining an all-optical lookup table in a decoding based on the BG according to the embodiment of the present invention.

As described above, the input optical signal, i.e., the input code is copied as many times as there are types of codes to be decoded, and the code copies are fed into different BGs. The information represented by the input code is recognized according to whether or not the wavelength arrangement of the code is matched to the arrangement of the grating sections of the BG.

More specifically, if the wavelength arrangement of the input code is the exact reverse to the arrangement of the grating sections of the BG, the intensity of the optical pulse is at maximum, as stated above; otherwise, the intensity of the optical pulse is less than the maximum. Thus the information represented by the code is recognizable by the measurement of the optical intensity.

In this manner, the optical signal passing through the decoder 301 has different levels of intensity according to the arrangement of the optical pulses.

The output signal of the decoder 301 is fed into the intensity determiner (e.g., the one denoted by 401) corresponding to the switching controller 400, and converted to an electrical signal through the photodetector 4011 of the intensity determiner 401. The determiner 4012 discriminates the code of the header based on the detected electrical signal, and determines a routing destination according to the discriminated code.

When the encoded header is correctly decoded, the intensity of the optical signal is at maximum. Hence, the intensity of the electrical signal is also at maximum. The determiner 4012 determines whether or not the intensity of the detected electrical signal exceeds a designated level, and selects a routing destination. Based on the result of selection, the corresponding switching plane of the switching section 500 is controlled to couple the input payload (data) to the output port corresponding to the destination OGX.

The routing of the payload includes a process of transferring the payload from an origination OGX to the OGXs other than the OGX concerned. So, the number of switching planes of the switching section 500 is "k", the number k of the OGXs connected to the network, and the number of output ports of each switching plane is "k−1", the number of OGXs other than the OGX as a source of the packet. The payload is fed into the corresponding switching plane through a wavelength designated to the origination OGX, so that the MLX routinely discriminates the origination OGX of the payload (namely, the origination OGX is in a one-to-one correspondence with the switching plane in hardware). The payload is transferred between different OGXs, i.e., the origination OGX differs from the destination OGX, so the number of codes (headers) for representing the connection between the origination OGX and the destination OGX is n=k(K−1). The n codes can be mapped as (origination OGX #, destination OGX #)=(i, j). Thus the payload switch is controlled for routing the payload to the designated output port of the switching plane routinely designated according to each code, in steps S230 and S240.

As mentioned above, the switching plane is in a one-to-one correspondence with the destination OGX, and the output port of each switching plane means the destination OGX.

Each of the k switching planes has k−1 output ports, each of which is coupled to a specific destination OGX. The packets can be simultaneously routed from k−1 switching planes to the same destination OGX at the worst, so the wavelength used for transmission of the payload from the origination OGX to the MLX must be converted to a wavelength designated by output ports of each switching plane.

The payload output from the designated output port of the payload switch of the switching section 500 is fed into the wavelength converting section 600, which then converts the wavelength of the payload to a wavelength designated to the output port, in step S250. The total number of wavelength converters of the wavelength converting section 600 is preferably the same as that of the codes.

To be transferred to the destination OGX, the wavelength-converted payload is wavelength-multiplexed at the WMUX of the wavelength multiplexing section 700, intensity-regulated at the amplifier AMP, and sent to the network, in step S260.

Upon receiving the optical signal routed and sent to the network, the destination OGX drops k−1 designated wavelengths by way of a WADM (WDM ADD/DROP Multiplexer). So, the payload is routinely transferred to the destination OGX.

Figure 9:
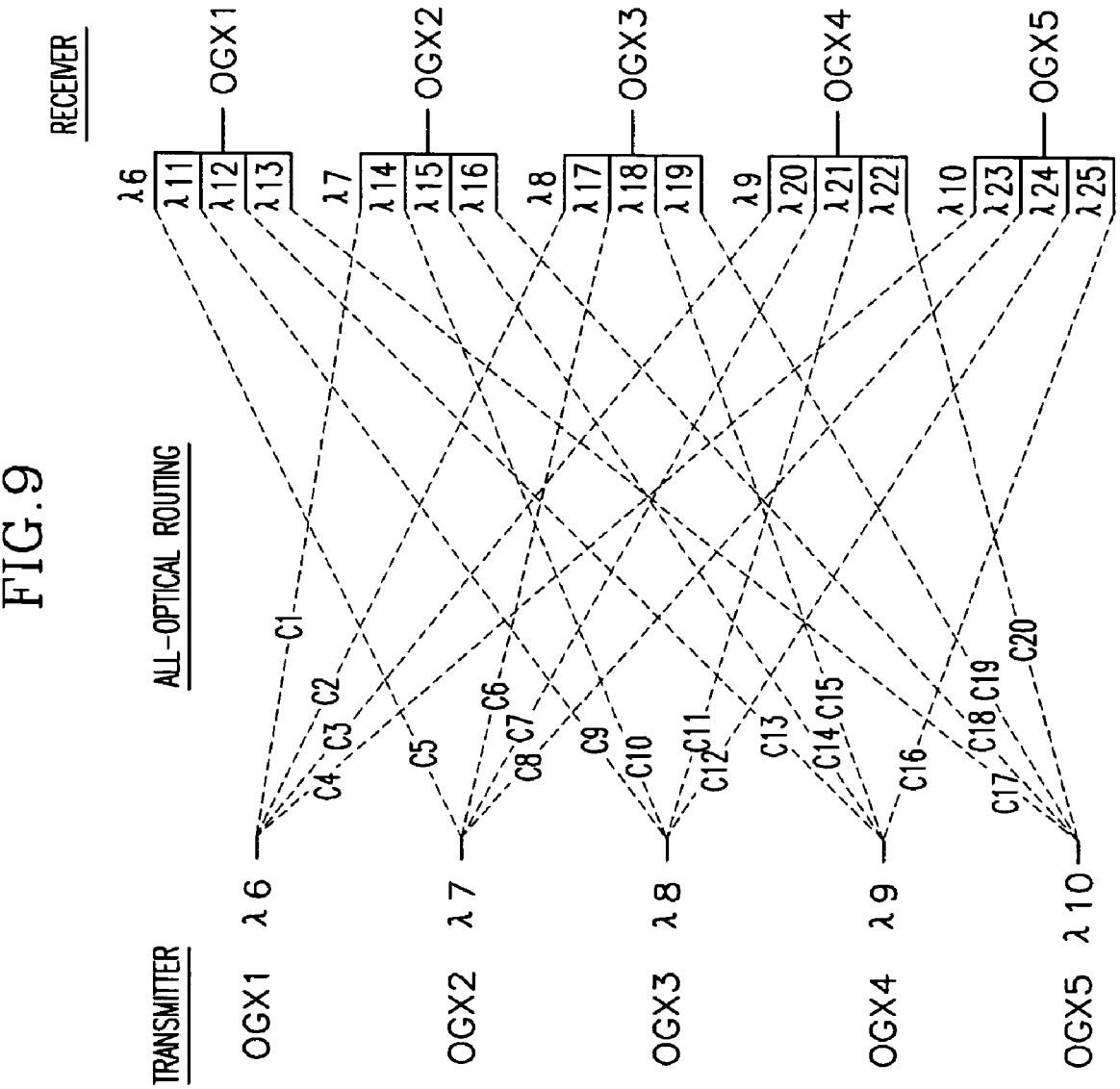
FIG. 9 is an exemplary diagram showing wavelength allocation for all-optical routing according to the embodiment of the present invention.

FIG. 9 exemplifies the above-stated all-optical packet routing method according to the embodiment of the present invention.

Let m=k=5, where m is the number of wavelengths used for encoding, and k is the number of OGXs. The wavelengths allocated to the transmitter and the receiver and the codes assigned for all-optical routing are illustrated. Five wavelengths λ1 to λ5 are used for code generation.

For m=5, theoretically 120 (=m!; m factorial) different codes are generated, but the error probability of the determination after decoding caused by noise is generally increased with the smaller m.

In FIG. 9, the transmitter OGX #1 carries the payload on the wavelength λ6, selects one of the codes (headers) c1 to c4 according to the destination OGX, and sends towards MLX the selected code (header) attached to the payload.

The MLX separates the payload from the header, and inputs the payload to the input port of the switching plane #1. According to the code of the header, the input port of the switching plane #1 is coupled to the output port. For code c1, for example, it is coupled to an output port to the OGX #2. Passing through the output port, the payload is converted to the wavelength λ7 and sent to the network. In OGX #2, only the wavelengths λ7, λ14, λ15, and λ16 are dropped by the WADM, so the payload on the wavelength λ7 is routinely transferred to the OGX #2.

The wavelengths λ6 to λ10 used for coupling the origination OGX to the MLX are all reused for transmission of optical signals between the MLX and each of the destination OGXs, because the network is of a ring structure that transmits the optical signals in either a clockwise or a definite direction.

As can be seen from FIG. 9, for the receiver OGX #2, the MLX transmits optical signals to the receiver using different wavelengths according to the transmitter OGXs, thus avoiding a collision, even when the transmitter OGXs send the optical signals simultaneously to a same destination OGX. The total number of wavelengths used in the ring structure is k×(k−1)+m, because the number of wavelengths used for payload transmission is k×(k−1) and that of additional wavelengths for code generation is m.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the embodiment of the present invention, the following effect can be acquired:

(1) The all-optical routing method is provided for all-optical routing of optical packets using an optical label comprising a combination of multiple wavelengths at the same level as the traditional MPLS that label-switches packets in a network comprised of electrical systems;

(2) The all-optical routing of optical packets is enabled without optical-electrical conversion, using an optical header as in the MPLS, without an optical buffer or a FDL, by way of the above-stated technologies, such as multi-wavelength encoding, multi-wavelength decoding technology based on header separation and optical table lookup, all-optical payload switching by controlling a payload switch based on the decoding result, or payload wavelength conversion for preventing a collision of optical packets forwarded to a destination without an optical buffer or a FDL;

(3) When the number of wavelengths involved in the encoding is m, at most m! (m factorial) different codes can be generated theoretically. But, the error probability of the determination after decoding caused by noise generally increases with the smaller m, so the maximum number of codes generated is determined in the lower range according to the network structure and quality requirements when m is small. It is expected, however, that the number of codes generated approximates the theoretical maximum value with the larger m. In the MPλS that uses the wavelength as a code, the number of codes generated is equal to that of the used wavelengths. Accordingly, the identification generating method of the present invention produces much more various types of code than MPLS; and (4) The present invention routes the optical payload without optical-electrical conversion or delay, so the data rate is irrespective of the processing capacity of electronic equipment but is restricted only by the physical transmission capacity. Accordingly, data-rate-free all-optical routing can be implemented.

What is claimed is:

1. A communication node system, which generates an optical packet in a network having a plurality of communication nodes connected thereto, the communication node system comprising:

an optical frame generating and wavelength multiplexing section for generating data based on a first light source and a primitive code based on a second light source, and wavelength-multiplexing the generated data and primitive code;

an encoding section including a plurality of encoders for encoding the primitive code according to a destination communication node, and attaching the encoded code to the data to generate an optical packet, wherein each encoder of the plurality of encoders includes:

a BG (Bragg Grating) for encoding an optical signal, the BG having a plurality of grating sections for reflecting a uniquely designated wavelength, wherein the grating sections of the BG are divided into a plurality of code sections for encoding the primative code, and a data section for encoding the data, wherein the code sections and the data section are apart from each other by a distance given by the following equation:

$$L_G = T_R/2(c/n)$$

wherein c is a velocity of light;

n is a refractive index of an optical path;

$T_R$ is a time for the routing control; and $L_G$ is a spatial distance between the code sections and the data section, an optical amplifier for amplifying the optical packet and outputting the amplified optical packet to the network, and an optical switching section comprising a plurality of optical switches, the plurality of optical switches operate to couple the data and the primitive code output from the optical frame generating and wavelength multiplexing section to one of the plurality of encoders of the encoding section according to a destination based on a selected encoding code type.

2. The communication node system as claimed in claim 1, wherein the optical frame generating and wavelength multiplexing section comprises:

m light sources for generating the primitive code;

a data light source for generating a data optical signal;

m modulators for modulating the primitive code to generate a code optical pulse signal, when using an external modulation method;

a data modulator for modulating the data to generate data optical bits, when using the external modulation method; and an optical multiplexer for wavelength-multiplexing the code optical pulses and the data optical bits, wavelengths of the primitive code being shared by all the communication nodes, a wavelength for the data optical signal being designated uniquely from communication node to communication node, the wavelengths for the primitive code using a different wavelength band from the wavelengths for the data optical signal.

3. The communication node system as claimed in claim 1, wherein each encoder of the plurality of encoders comprising:

a circulator for circulating an input optical signal in a definite direction, and outputting the optical signal; the BG encodes the optical signal output from the circulator, the grating sections being formed at designated intervals, the number of grating sections being m+1, wherein m is the number of wavelengths constituting the code.

4. The communication node system as claimed in claim 3, wherein the data section is positioned after the code sections from the entrance of BG.

5. The communication node system as claimed in claim 1, wherein the optical switches being operated in a 1(k−1) form, wherein k is the number of communication nodes connected to the network.

6. The communication node system as claimed in claim 5, wherein the data includes a preamble inserted therein to secure stable switching by providing a further timing margin for routing control in addition to $T_R$.

7. An all-optical packet routing system, which transfers an optical packet generated from one source communication node to a destination communication node in a network having a plurality of communication nodes connected thereto, the all-optical packet routing system comprising:

a packet divider for dividing the optical packet input through the network by wavelengths into a header corresponding to a code and a payload corresponding to data, the packet divider comprises a wavelength demultiplexer (WDUX);

a header reproducer for wavelength-multiplexing the header and reproducing the wavelength-multiplexed header into n identical copies, wherein n is the number of codes used in the whole network;

a decoding section including a plurality of decoders for analyzing the n reproduced header copies, wherein each of said decoders includes:

a circulator for circulating an optical signal corresponding to the input header in a definite direction; and a BG for decoding the optical signal output from the circulator, the BG having a plurality of grating sections for reflecting optical signals of different wavelengths, the grating sections being positioned at designated intervals, the grating sections being arranged in the reverse order of grating sections of a BG used for encoding the optical signal, the intensity of a signal output from the BG for decoding being varied according to whether or not a wavelength arrangement order of the input optical signal is matched to an arrangement order of the grating sections of the BG for decoding;

a switching section for switching the payload output from the packet divider to a designated output port according to an analyzed output of the decoding section wherein the switching section comprises a three-dimensional (3D) payload switch, the 3D payload switch comprising a plurality of switching planes for performing routing of the payload, the number of switching planes being k, the number of communication nodes connected to the network, each switching plane having k−1 output ports;

a wavelength converting section for wavelength-converting the payload output from the switching section to a wavelength designated by output ports;

a wavelength multiplexer for wavelength-multiplexing the wavelength-converted payload, regulating an intensity of the wavelength-multiplexed payload, and outputting the intensity-regulated payload to the network, thereby feeding the payload into the destination communication node;

a plurality of intensity determiners each coupled to a respective decoder of the plurality of decoders, each intensity determiner of the plurality of intensity determiners comprising:

a photodetector for outputting an input optical signal as an electrical signal; and a determiner for determining a destination of the payload based on a detected intensity of the optical signal, wherein the switching section is controlled by the determiner to couple the optical packet to a determined Optical Gigabit Switch (OGX).

8. The all-optical packet routing system as claimed in claim 7, wherein the decoding section comprises n decoders, the n reproduced header copies being simultaneously fed into the n decoders, respectively, wherein n=k×(k−1); and k is the number of communication nodes connected to the network.

9. The all-optical packet routing system as claimed in claim 7, wherein the optical signal corresponding to the header comprises m optical pulses having different wavelengths, the intensity of the optical signal output from the BG being at maximum and ideally m times as high as the intensity of a single pulse, when the wavelength arrangement order of the optical signal is matched to the arrangement order of the grating sections.

10. The all-optical packet routing system as claimed in claim 7, wherein each switching plane of the 3D payload switch is in a one-to-one correspondence with the source communication node, each output port of the switch being coupled to one destination communication node.

11. The all-optical packet routing system as claimed in claim 7, wherein the number of codes for marking a connection between the source communication node and the destination communication node is n=k×(k−1), the wavelength converting section comprising k×(k−1) wavelength converters for wavelength-converting the input payload to a wavelength designated by output ports, wherein k is the number of communication nodes connected to the network.

12. An all-optical packet routing network, which transfers an optical packet in a network, the all-optical packet routing network comprising:

at least three communication node systems; and a routing system, wherein the communication node system comprises:

an optical frame generating and wavelength multiplexing section for generating data and a primitive code, and wavelength-multiplexing the generated data and primitive code;

an encoding section for encoding the primitive code according to a destination communication node, and attaching the encoded code with the data to generate an optical packet; and an optical amplifier for amplifying the optical packet to be transmittable, and outputting the amplified optical packet to the network, wherein the routing system comprises:

a packet divider for dividing the optical packet received from the communication node system via the network by wavelengths into a header corresponding to the code and a payload corresponding to the data, the packet divider comprises a wavelength demultiplexer (WDUX);

a header reproducer for wavelength-multiplexing the header, and reproducing the wavelength-multiplexed header into n identical signals, wherein n is the number of codes used in the whole network;

a decoding section including a plurality of decoders for analyzing the n reproduced header copies wherein each of the decoders includes:

a circulator for circulating an optical signal corresponding to the input header in a definite direction; and a BG for decoding the optical signal output from the circulator, the BG having a plurality of grating sections for reflecting optical signals of different wavelengths, the grating sections being positioned at designated intervals, the grating sections being arranged in the reverse order of grating sections of a BG used for encoding the optical signal, the intensity of a signal output from the BG for decoding being varied according to whether or not a wavelength arrangement order of the input optical signal is matched to an arrangement order of the grating sections of the BG for decoding;

a switching section for switching the payload output from the packet divider to a designated output port according to an analyzed output of the decoding section wherein the switching section comprises a three-dimensional (3D) payload switch, the 3D payload switch comprising a plurality of switching planes for performing routing of the payload, the number of switching planes being k, the number of communication nodes connected to the network, each switching plane having k−1 output ports;

a wavelength converting section for wavelength-converting the payload output from the switching section to a wavelength designated by output ports;

a wavelength multiplexer for wavelength-multiplexing the wavelength-converted payload, regulating an intensity of the wavelength-multiplexed payload, and outputting the intensity-regulated payload to the network, thereby feeding the payload into the destination communication node;

a plurality of intensity determiners each coupled to a respective decoder of the plurality of decoders, each intensity determiner of the plurality of intensity determiners comprising:

a photodetector for outputting an input optical signal as an electrical signal; and a determiner for determining a destination of the payload based on a detected intensity of the optical signal, wherein the switching section is controlled by the determiner to couple the optical packet to a determined Optical Gigabit Switch (OGX).

13. The all-optical packet routing network as claimed in claim 12, wherein when the number of wavelengths of the code is m and the number of all the communication node systems connected to the network is k, k×(k−1) wavelengths are used for transmission of the payload, and the total number of codes used in the whole network being given as n=k×(k−1).

14. A communication node system, which generates an optical packet in a network having a plurality of communication nodes connected thereto, the communication node system comprising:

an optical frame generating and wavelength multiplexing section for generating data and a primitive code, and wavelength-multiplexing the generated data and primitive code;

an encoding section including a plurality of encoders for encoding the primitive code according to a destination communication node, and attaching the encoded code to the data to generate an optical packet;

an optical amplifier for amplifying the optical packet and outputting the amplified optical packet to the network, and an optical switching section comprising a plurality of optical switches, the plurality of optical switches operate to couple the data and the primitive code output from the optical frame generating and wavelength multiplexing section to one of the plurality of encoders of the encoding section according to a destination based on a selected encoding code type, wherein each encoder including a BG (Bragg Grating) for encoding the optical signal output from the circulator, the BG having a plurality of grating sections, the grating sections of the BG are divided into a plurality of code sections for encoding the code, and a data section for encoding the data, the data section being positioned after the code sections from the entrance of BG, and the code sections and the data section are apart from each other by a distance given by the following equation:

$$L_G = T_R/2(c/n)$$

wherein c is a velocity of light;
n is a refractive index of an optical path;
$T_R$ is a time for the routing control; and
$L_G$ is a spatial distance between the code sections and the data section.

* * * * *